INVENTORS.
Anthony J. Carbone
Earl E. Guilford
Marvin J. Kreh
BY W. D. Miller
ATTORNEY United States Patent Office 3,279,503
Patented Oct. 18, 1966

3,279,503
SNAP-ON FOAMED RESIN INSULATION
Anthony J. Carbone, Earl E. Guilford, and Marvin J. Kreh, Midland, Mich., assignors to The Dow Chemical Company, Midland, Mich., a corporation of Delaware
Filed Aug. 19, 1963, Ser. No. 302,797
7 Claims. (Cl. 138—128)

This invention relates to a foamed resin insulation adapted for installation by snapping it about a cylindrical body and to the method of manufacturing this type of insulation. More particularly this invention concerns an elongated split cylinder of insulating material produced by passing a strip of foamed thermoplastic resin over a heated mandrel and inside a forming member whereby the resin strip is coiled into a cylinder with split, overlapping edges then cooled in that form to produce a resilient member. This insulation is easily installed by opening the overlapped joint or seam sufficiently to slip the cylinder over a pipe or other cylindrical body so that the resilience of the foamed resin closes the joint.

Pipes transporting hot or cold fluids having a temperature differential with the atmosphere up to about 200° F. frequently are insulated to reduce the rate of heat transfer between the fluids and the air surrounding the pipe. In the case of pipes carrying cold fluids the insulation should prevent the condensation of moisture on the cold surfaces of the pipe as well as reduce the rate of heat transfer. Some insulating materials are easily wet by water and become water soaked in a moisture-condensing environment unless they are protected by a vapor barrier. Even then an accidental impact may perforate the barrier to permit condensation and deterioration of the insulation. Water-permeated insulation has a high heat transfer rate, therefore it has little value as an insulating material. Where the fluids in the pipe are at a temperature below 32° F., as in the case of refrigerant lines, the condensate freezes and sometimes disintegrates the body of insulation. Thus, suitable insulation generally is provided either by threading the pipe through a tubular material before the piping is installed or by enclosing the installed piping with insulation covered by a vapor barrier. In some instances tubular insulation is split longitudinally so that it may be installed around in-place piping. Thereafter an adhesive may be applied along the split to provide a vapor seal for the insulation.

According to this invention an insulating material is provided which may be installed easily on in-place piping. Additionally the insulation is substantially impervious to water vapors and presents a hydrophobic surface which resists permeation by moisture condensed on the pipe. Thus, a layer of a material having a high insulating value, i.e., a low heat transfer coefficient, even in the environment of condensed moisture, is provided in a form which is easily installed. In the event piping repairs are necessary, the insulation also is easily removed in a manner which does not damage it so that it may be re-used.

The invention will be described by referring to the accompanying drawings.

The foamed resin used in preparing the snap-on insulation may be prepared by impregnating a sheet of resin with a blowing agent then heating the sheet at low pressure to vaporize the blowing agent and produced a foamed structure having closed cells. It is desirable that the resin structure contain closed cells, however an open-celled foam may be used and the surfaces of the foamed sheet sealed. Another method of producing the foam involves the impregnation of resin granules with a blowing agent then subjecting a thin layer of these granules to blowing conditions with the particles confined between parallel plates whereby the space becomes filled with the expanded particles which stick together forming a cohesive sheet of foamed resin. These sheets have sufficient resiliency to be spooled prior to their use in forming the snap-on insulation.

Figure 1:
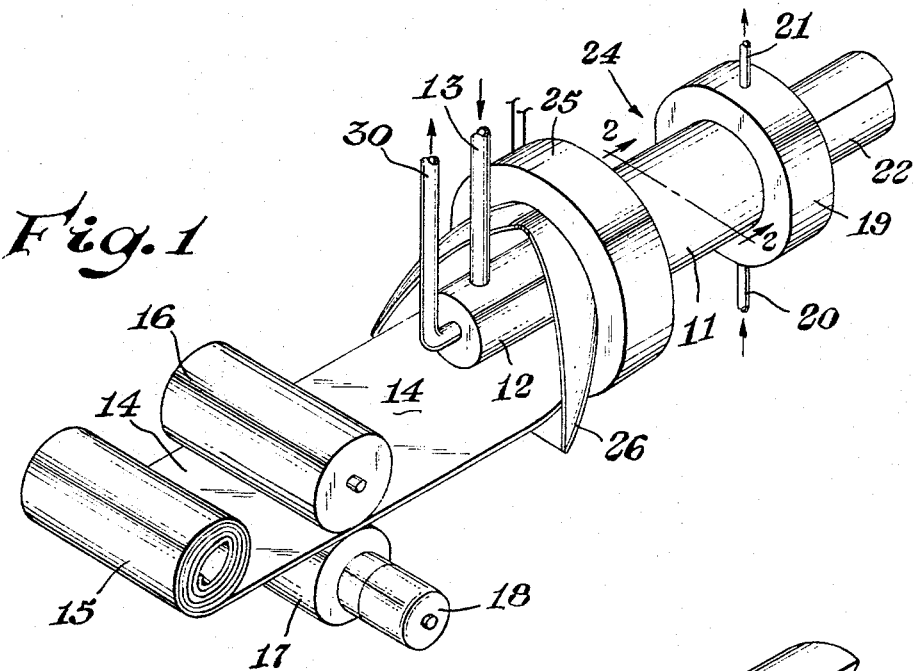
FIGURE 1 illustrates the method of producing the insulating material forming a part of our invention.

In FIGURE 1 sheet foam 14 from supply roll 15 is moved into forming device 24 by feed roller 17 driven by motor 18 with pressure roll 16 holding the sheet against the feed roller. The sheet enters funnel 26 at the forward end of forming tube 11 and is gradually coiled into the proper shape as it approaches the forming tube. Heater 25 near the apex of funnel 26 heats the foam and aids in relieving stresses produced by the shaping step. Heater mandrel 12 is positioned parallel to the axis of forming device 24 also heats the resin as it enters the forming tube to aid in shaping it. As the coiled resin moves toward the discharge end of tube 11 it passes through cooler 19 to lower the temperature below its heat distortion temperature so that the coiled shape will be retained. A coolant is circulated through the cooler via inlet 20 and outlet 21. Foamed insulation emerging from the cooler may be cut in desired lengths and sent to storage. When desired, a spiraled overlapping seam may be produced by feeding the sheet foam into funnel 26 at an angle to the axis of forming device 24.

Figures 2, 3:
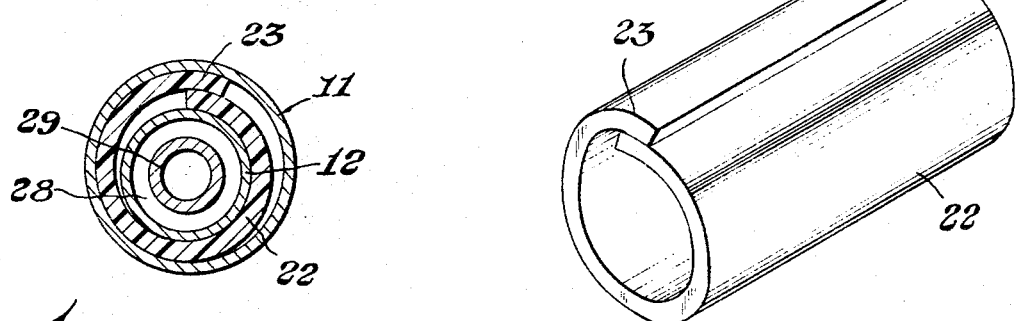
FIGURE 2 is a cross-sectional view of the apparatus of FIGURE 1, the view being taken along section 2—2 of that figure.
FIGURE 3 is a view of a section of the snap-on insulation produced according to this invention.
Figure 2A:
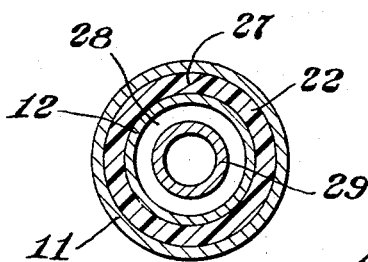
FIGURE 2a is a view similar to FIGURE 2 illustrating another type of overlap in the insulation.

FIGURE 2 illustrates the forming operation as it occurs within the portion of the forming tube containing the heater mandrel. Although numerous types of heaters may be used the one illustrated is that commonly referred to as a bayonet heater. Steam line 13 admits live steam to annular channel 28 in heater 12. Steam condensate is removed via tube 29 and line 30. The coiled sheet of foamed resin indicated at 22 having overlap 23 completely fills the annulus between heater mandrel 12 and forming tube 11 except for the arcuate segments at the ends, i.e., edges of the coiled resin. These voids may be eliminated by using sheet foam having beveled edges 27 which provide a smooth overlap of substantially uniform thickness as shown in FIGURE 2a. The heater mandrel should be axially aligned in the forming tube when using the beveled edge resin whereas a slight offset is necessary with the type of overlap illustrated in FIGURE 2. The bayonet tube may be flexibly supported in the forming tube so that it can be shifted from an axial position to an off-center position as shown in FIGURE 2 to accommodate the double thickness of foam at the overlap along one side of the forming tube.

The outside diameter of the heater mandrel preferably is approximately equal to or slightly less than the outside diameter of the pipe to be insulated. This arrangement provides a snug fit of the insulation with the pipe. Overlap 23 provides a seal between the edges when the insulation is used on pipe having a diameter at least as great as that of the heater mandrel used in coiling the insulation. The width of sheet 14 supplied from roll 15 should be chosen to give the desired amount of overlap 23 in the coiled insulation. An overlap covering a 5° to 30° segment of the circumference is desirable. Small diameter pipes generally require less overlap than large diameter pipes.

In addition to the diameter of the heater mandrel the thickness of sheet 14 determines the diameter of forming tube 11 required for coiling the foamed resin. Sheets having a thickness between about ⅛ inch and 1 inch may be coiled into snap-on insulation according to this invention, however sheets between about ⅛ inch and ½ inch are preferred. Sheets having a thickness in this range generally have sufficient flexibility to permit easy installation without danger of fracturing. Where thicker insulation is required, multiple layers of thin sheets may be installed.

Any of the thermoplastic resins commonly used in preparing foams may be employed in practicing this invention. Suitable resins include the homopolymers of vinylidene aromatic compounds such as styrene, vinyl toluene, vinyl xylene, ethylvinyl benzene, isopropyl styrene, and chlorostyrene as well as copolymers of these. Additionally, thermoplastic copolymers of these vinylidene aromatic compounds and monomers such as butadiene, methyl acrylate, methyl methacrylate and acrylonitrile may be used. Homopolymers and copolymers of various vinyl compounds such as ethylene, isobutylene, vinyl chloride, vinylidene chloride and vinyl acetate may be used. These resins are hydrophobic and do not promote permeation by moisture condensed from the atmosphere on cool surfaces nor by precipitation such as rain and snow. Additionally, they are rigid and sufficiently resilient to produce the coiled insulation having the snap-on feature. In some instances it may be desirable to employ foamed resins containing a flame retardant such as a halogenated compound, a phosphate or the like.

This snap-on insulation is installed on pipe by springing apart the overlap so that the pipe may be inserted through the slit. The elongated coil of insulation is then twisted until the pipe nestles snugly inside with the overlap closing the slit. So long as the internal diameter of the coiled insulation is no greater than the outside diameter of the pipe, the insulation will produce a snug fit with the overlap providing a resilient closure. If desired, an adhesive may be applied along the overlap seam to produce a vapor-tight closure. Straps generally are not required to retain the insulation on the pipe. Cylindrical vessels and large diameter pipe insulated with this material may require adhesives, straps or the like to retain the insulation.

Although our invention has been described with particular emphasis on the use of this snap-on material as thermal insulation it should be understood it has utility where thermal factors are not involved. Small fruit trees having tender bark are sometimes attacked by rodents and insects as well as being injured by sunlight before there is sufficient growth in the tree to shade the trunk. This snap-on insulation is easily installed on the trunks and provides adequate protection against these hazards.

Another use is as a bottle wrap or packing material to prevent breakage. Bottles having substantially cylindrical shapes may be covered with a sleeve of the insulation before they are placed in a packing case or carton. Another use is as a safety cushioning material for pipes, pillars, and the like which are located at a place where there is a possibility that people will accidentally bump into them.

We claim:
1. Snap-on insulation for substantially cylindrical bodies comprising an elongated sheet of a resilient thermoplastic foamed resin thermoformed into a substantially cylindrical shape whereby one edge of said sheet overlaps the other edge thereof to produce a resilient closure.

2. Snap-on insulation according to claim 1 wherein said foamed resin has a thickness between about ⅛ inch and ½ inch.

3. Snap-on insulation according to claim 1 wherein said edges overlap through a circumferential segment between about 5° and about 30°.

4. Snap-on insulation according to claim 1 wherein said resin is a cohesive sheet of foamed granules of polystyrene.

5. Snap-on insulation according to claim 1 wherein the edges of said sheet are beveled whereby the thickness of said coiled resin is substantially uniform throughout.

6. Snap-on pipe insulation comprising an elongated sheet of a hydrophobic resilient thermoplastic foamed resin having closed cells, said sheet being thermoformed into a substantially circular shape with one edge overlapping the other edge through a circumferential segment between about 5° and about 30°.

7. Snap-on pipe insulation according to claim 6 wherein said resin is polystyrene.

References Cited by the Examiner

UNITED STATES PATENTS

| | | | |
|---|---|---|---|
| 504,744 | 9/1893 | De Pezzer | 138—128 |
| 1,435,311 | 11/1922 | Knight | 138—128 X |
| 2,797,443 | 7/1957 | Carlson | 264—53 X |
| 3,079,641 | 3/1963 | Knox et al. | 264—321 X |
| 3,204,668 | 9/1965 | Emerson et al. | 138—162 X |

FOREIGN PATENTS

| | | |
|---|---|---|
| 1,009,949 | 6/1957 | Germany. |
| 913,685 | 12/1962 | Great Britain. |

LAVERNE D. GEIGER, *Primary Examiner.*

T. MOORHEAD, *Assistant Examiner.*